United States Patent [19]
Cotton

[11] 3,811,791
[45] May 21, 1974

[54] THRUST AUGMENTING DEVICE FOR JET AIRCRAFT

[76] Inventor: Robert B. Cotton, 1503 Old Orchard Rd., Media, Pa. 19063

[22] Filed: July 9, 1973

[21] Appl. No.: 377,784

Related U.S. Application Data

[63] Continuation-in-part of Ser. No. 171,197, Aug. 12, 1971, abandoned.

[52] U.S. Cl. .......... 416/129, 60/39.16 C, 60/226 R, 244/69, 244/73, 415/79, 416/171
[51] Int. Cl. ............................................. B64c 11/48
[58] Field of Search .......... 60/226 R, 262, 268, 269, 60/39.11 C, 39.16 R; 415/79, 77, 147; 244/63, 74, 52, 58, 53 R, 55, 60, 62, 65, 69, 73, 74, 13, 15; 416/193, 128, 129, 171

[56] References Cited
UNITED STATES PATENTS

| | | | |
|---|---|---|---|
| 2,478,206 | 8/1949 | Redding | 60/226 R |
| 2,505,660 | 4/1950 | Baumann | 60/226 R |
| 2,613,749 | 10/1952 | Price | 244/60 X |
| 3,273,654 | 9/1966 | Pinnes | 416/171 X |
| 3,720,060 | 3/1973 | Davies et al. | 60/226 R |

Primary Examiner—Milton Buchler
Assistant Examiner—Paul E. Sauberer
Attorney, Agent, or Firm—Connolly and Hutz

[57] ABSTRACT

A dual set of counter-rotating impulse turbine wheels having short propeller blades about their periphery are disposed in the exhaust emitted by a jet engine to augment its thrust at lower subsonic speeds by extracting energy from the high velocity gases. The counter rotation minimizes torque loads. The turbine wheels may be closely mounted behind the engine and directly connected thereto or movably mounted for optional retraction out of the path of the exhaust at higher speeds when the jet engine is more efficient.

9 Claims, 6 Drawing Figures

THRUST AUGMENTING DEVICE FOR JET AIRCRAFT

CROSS-REFERENCES TO RELATED APPLICATIONS

This application is a continuation-in-part of U.S. Pat. application Ser. No. 171,197 now abandoned, filed Aug. 12, 1971.

BACKGROUND OF THE INVENTION

This invention relates to a device for augmenting the thrust of a jet engine as described in U.S. Pat. No. 3,400,903. Standard turbo-jet engines are not efficient at relatively low take-off, landing and cruising speeds. Attempts have been made to improve their efficiency by turbo-prop or turbo-fan auxiliary stages. Such devices, however, unduly complicate the engine and prevent it from attaining relatively higher sonic and supersonic speeds. U.S. Pat. No. 3,273,654 describes a retractable turbine and fan device interposed in the jet exhaust at lower speeds and retracted out of the exhaust at higher speeds. Inherent efficiency and torque problems, however, create doubt that such a device could be effective and practiced. An object of this invention is to provide a thrust augmenting device for interposition in a jet engine exhaust which is relatively efficient and has minimized interference with a jet engine to which it is applied.

SUMMARY

A dual set of counter-rotating turbine wheels with short peripheral propeller blades are mounted closely behind a jet engine by connection to the rear of the engine or on a retractable support connected to the aircraft. Obstruction to the flow of the jet gases from the engine is minimized by making all of the turbine elements movable and especially by utilizing impulse turbine blades. Free jet gas exhaust is also promoted by radially enlarging the turbine area aft of the engine. This invention provides a relatively high bypass ratio for the ultimate engine. The short propeller blades operate at relatively low tip speeds which are concomitant with efficient turbine speeds, thus avoiding the necessity for speed reduction devices such as gearing. The counter rotation cancels out torque loads which stabilizes the aircraft and supporting structure for the thrust-augmenting unit.

BRIEF DESCRIPTION OF THE DRAWING

Novel features and advantages of the present invention in addition to those mentioned above will become apparent to one skilled in the art from a reading of the following detailed description in conjunction with the accompanying drawings wherein similar reference characters refer to similar parts and in which.

DESCRIPTION OF THE PREFERRED EMBODIMENT

Figure 1:
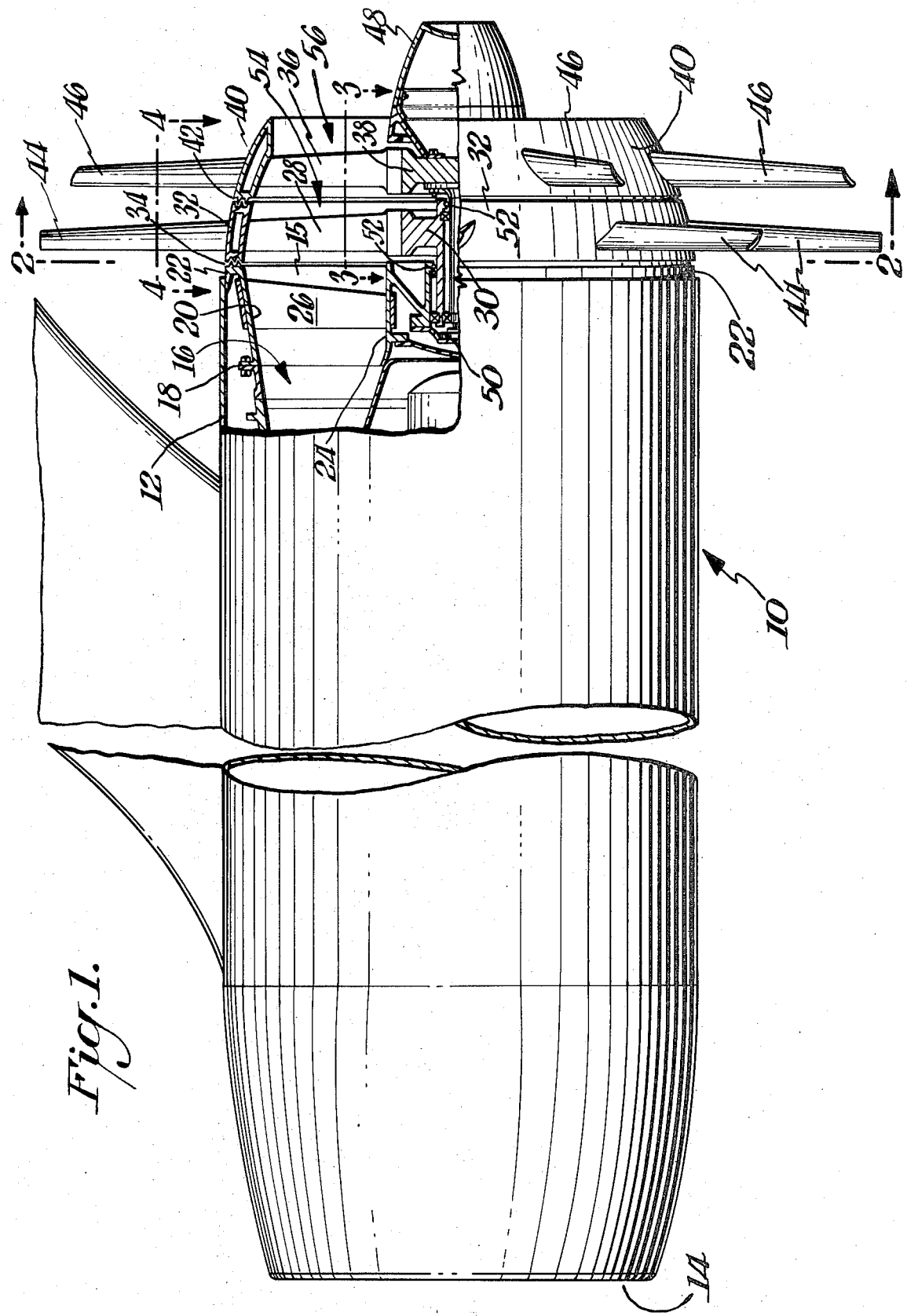
FIG. 1 is a side elevational view (part of which is in cross-section) illustrating an aircraft jet engine with a thrust-augmenting embodiment of this invention mounted thereon.
Figure 2:
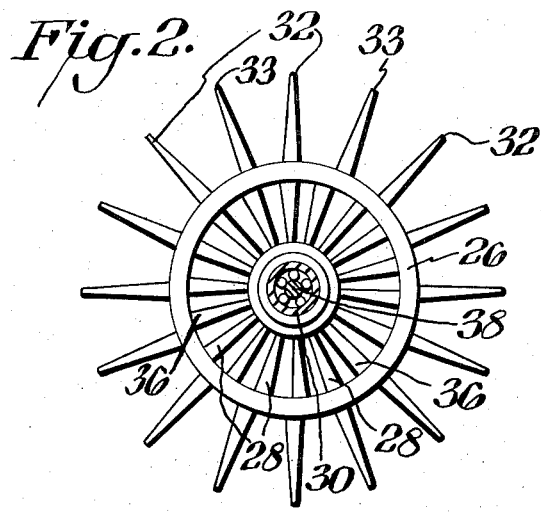
FIG. 2 is a cross-sectional view taken through FIG. 1 along the line 2—2.

FIGS. 1-4 illustrate one embodiment of this invention, wherein, FIG. 1 illustrates a complete jet engine 10 installed in a nacelle 12 with engine air intake at 14 and exhaust nozzle 15. The basic portion of engine 10 is a typical two spool turbo-jet engine including the following sections not illustrated: a low pressure compressor driven by the low pressure turbine, a high pressure compressor driven by the high pressure turbine, a combustion chamber, and bearings for the engine shafts. The turbo-jet section or gas generator 16 ends at flange 18 of the engine casing. The gas generator exhaust gas at this station is usually at a pressure of approximately two atmospheres and a temperature of 1,200°F. It is the pressure and temperature of the gas generator exhaust gas which provide the motive power for the thrust augmenting turbines which will now be described.

The thrust augmenter comprises an outer housing 20 which is attached to flange 18 of gas generator 16, and it has a seal ring 22 providing a mount for nacelle skin 12. Outer housing 20 supports inner housing 24 by radial struts or vanes 26. First augmenter turbine blades 28 are supported on hollow disk shaft 30 which is rotatably mounted in inner housing 24 by bearings. Turbine blades 28 are peripherally enclosed by ring 32, which has a labyrinth seal 34 mating with seal ring 22.

Second augmenter turbine blades 36 are supported on disk and shaft 38 which is rotatably mounted in bearings within hollow disk and shaft 30. Turbine blades 36 are peripherally enclosed by ring 40, which has a labyrinth seal 42 mating with ring 32. Augmenter propeller blades 44 and 46 are mounted and supported by rings 32 and 40 respectively, which are segmented if so required by construction and assembly procedures. To minimize the base drag of the exhaust nozzle 15 aft of thrust augmenter turbines 54 and 56, spinner 48 is attached to disk and shaft 38. The bearings of the thrust augmenter shafts are lubricated from an oil reservoir external to the engine housing (not shown) and pressure and scavenge pumps 50 are provided in the bearing housing, driven by one of the turbine shafts. Oil seals 52 confine lubricating oil in the bearing cavity.

OPERATION

Gas flow from the turbo-jet gas generator leaves the last compressor turbine at a relatively high temperature, in the neighborhood of 1,200°F, at full power, and a total pressure head of approximately two atmospheres. Total pressure head in the accepted terminology of the turbine construction art means the sum of the absolute pressure of the gas and that pressure which would obtain if the velocity energy of the gas flow were converted isentropically to static absolute pressure. The ratio of velocity energy to static pressure energy leaving the compressor turbine is a matter of optimization for the jet engine designed and is relatively immaterial to the device disclosed herein.

Figure 3:
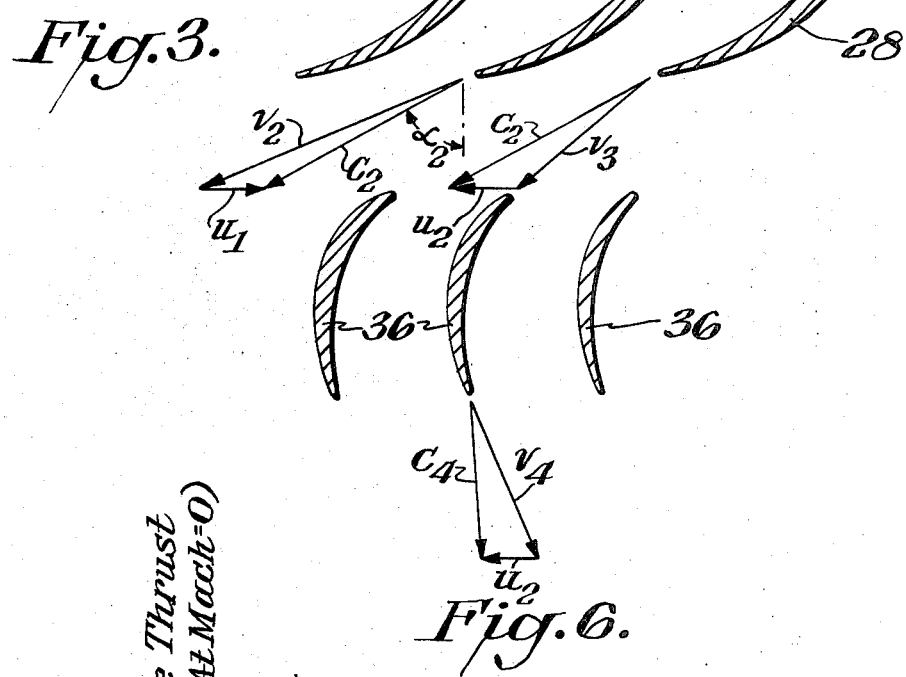
FIG. 3 is a diagrammatic cross-sectional view taken through FIG. 1 along the line 3—3 showing turbine blade sections and gas and blade velocity vectors.

The gas flow enters the thrust augmenting turbines at a velocity $C_1$ illustrated in FIG. 3. The velocity of this entering gas may be axial as illustrated in the drawing, but it also may be inclined towards the direction $U_1$ of the first turbine blade row velocity, in order to obtain additional power from the first augmenter turbine. The inclination of the vector $C_1$ may be obtained from the inherent swirl of the compressor turbine exhaust, which exists in many engines, or it may be caused or increased by vanes 26 if desired. The vector addition of the blade speed $U_1$ to the absolute gas velocity $C_1$ determines the relative velocity of the gas $V_1$ with respect to the blade sections shown in FIG. 3. The blade sections shown in FIG. 3 are only representative, being taken at the average radius of the augmenter turbine gas passage. Blade speed vector $U_1$ is less at lesser radii and greater at greater radii thus inclining the leading edge of the blades 28 at increasing deviation from the axial direction with increasing distance from the engine shaft, such that the leading edge of blades 28 intersects the relative oncoming gas at minimum incidence.

The relative exit velocity $V_2$ of blades 28 added vectorially to blade speed $U_1$, yields the absolute exit velocity $C_2$ of the first stage augmenter turbine. For a turbine with no appreciable inlet swirl, the tangential component of $C_2$ multiplied by the blade speed $U_1$ at the location of $C_2$, yields the shaft power developed by the turbine per pound of gas flow at the radius of $C_2$. In general, turbines are designed such that the specific power of the blades, H.P. per pound of gas flow, is relatively constant over the blade span. Thus, the tangential component of $C_2$ may decrease with increasing blade radius so that the product of $C_2U_1$ remains relatively constant. Therefore, the pitch and curvature of blade sections other than at section 3-3 are such as to satisfy the spanwise work distribution selected and the requirements of radial equilibrium, known to practitioners of the gas turbine art. The annular area of the gas path leaving the first augmenter turbine is effectively reduced by the cosine of the angle of gas flow exhaust from the blade row, $\alpha 2$ in FIG. 3. Since it is desirable to develop a substantial amount of power in the augmenter turbines, it is desirable to have large angles $\alpha 2$ of gas flow exhaust over the span of the first turbine blades. Therefore, the annular area of the augmenter turbine between the two turbine stages is substantially larger than the annular area of the compressor turbine exhaust as illustrated in FIG. 1.

It is desirable to obtain as much thrust as possible from the exhaust gas of the augmenter turbine. In this case the exhaust velocity $C_4$ should be very nearly in the axial direction and the second stage augmenter turbine obtains its power primarily from the exit swirl of the first stage exhaust, the specific power being the product of the tangential component of $C_2$ multiplied by the blade speed $U_2$ of the second turbine at the location of $C_2$. As shown by FIG. 3, the blade speed $U_2$ is in the same tangential direction of $C_2$ and opposite to the direction of the first stage blade speed $U_1$. If the absolute value of the second stage blade speed is identical to the first stage blade speed, the power developed by the second stage augmenter turbine 56 is identical to the power developed by the first turbine 54. The thrust augmenter power turbines 54 and 56 thus comprises two contra-rotating axial flow turbine wheels, each developing essentially identical power, differing only by whatever small differences between inlet and exit swirl which may exist.

The vector addition of the blade speed $U_2$ to the absolute gas velocity $C_2$ determines the relative velocity $V_3$ with respect to the second row blade sections shown in FIG. 3. Also, the vector addition of relative velocity $V_4$ and the blade speed $U_2$ yields the absolute exit velocity $C_4$ of the augmenter turbine. Because of the decreasing tangential component of $C_2$ and increasing blade speed $U_2$ with increasing distance from the engine shaft, second stage turbine blades 36 have an increasing counter clockwise twist with increasing radius, viewed in the plane of FIG. 3. The sections of blades 36 are selected to satisfy the aforementioned spanwise work distribution and radial equilibrium requirements. The gas entering the second stage turbine makes an angle with the engine axis that is very much greater than the angle of the gas leaving the second stage turbine. Because of this angular difference and notwithstanding a net average expansion of the gas and a possible reduction of velocity through the turbine blades 28 and 36, the annular area of the augmenter turbine at the exit of the second stage may be somewhat less than the annular area between the two turbine stages to obtain maximum exit velocity $C_4$. The annular area of the second stage turbine exhaust is selected so as to determine the performance parameters of the gas generator analogous to the way a nozzle determines the performance parameters of a turbo-jet engine.

Figure 4:
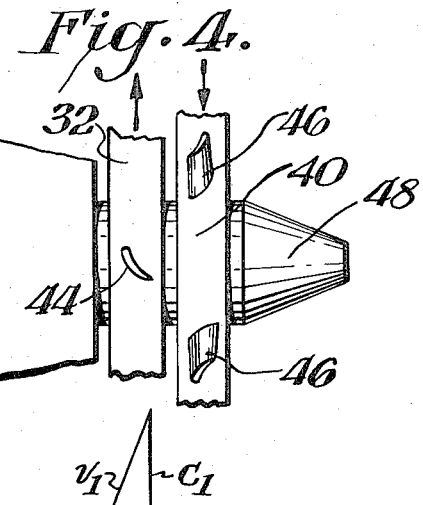
FIG. 4 is a fragmental cross-sectional view taken through FIG. 1 along the line 4—4 showing propeller blade sections.

Contra-rotating propellers 44 and 46 driven by the turbines 54 and 56 have, for example, eight or more blades on each turbine stage. There may, however, be engine performance requirements wherein less than this number of propeller blades is desirable. A section through propeller blades 44 and 46 is shown in FIG. 4 illustrating well-known components of the propeller art. The power developed by the turbines 54 and 56 drives propellers 44 and 46. Propeller blades 44 and 46 are not enclosed in a housing such as the fan in a turbo-fan engine and such propellers have a higher thrust efficiency than ducted fans at sub-sonic flight operation because there is no housing drag and no inlet diffuser loss present in a turbo-fan engine. An important feature of this invention is the use of dual rotating turbine-fan assemblies resulting in improved performance, less cost and less weight than existing gas generators used to propel vehicles in flight.

The ratio of the flow produced by the two counter-rotating propellers 44 and 46 and the residual gas flow leaving the turbines 54 and 56 is the bypass ratio, which is similar to the bypass ratio in a standard turbo-fan engine. The turbine-fan assemblies 54 and 56 can be replaced by larger or smaller assemblies in event of change in the required engine performance. For example, a large transport airplane usually used for long range might suddenly require the ability to take off from a short runway for a local short range flight. The operation would be to replace the turbine propeller assemblies with propellers of a smaller fixed blade angle, without changing the entire engine as would be required in the case of the turbo-fan engine.

To keep propellers 44 and 46 down to an acceptable noise level, the tip speed during take off should be low. The tip speed of some turbo-fan engines reaches 1,600 feet per second during take off and although much of the fan noise is muffled by enclosure of the fan, undesirable noise is produced.

At the lower propeller tip speed required for the acceptable noise level, the torque of a single propeller would be 70,000 foot pounds for a medium size engine, in event of engine failure during take off, a serious flight problem would occur if only one propeller were operating, which would be equivalent to a sudden load on one wing of approximately 1,400 pounds for a typical size transport airplane. This torque problem is avoided by the use of the dual counter-rotating turbine-propeller assemblies, and at the same time the noise level is kept down to an acceptable level.

Figure 5:
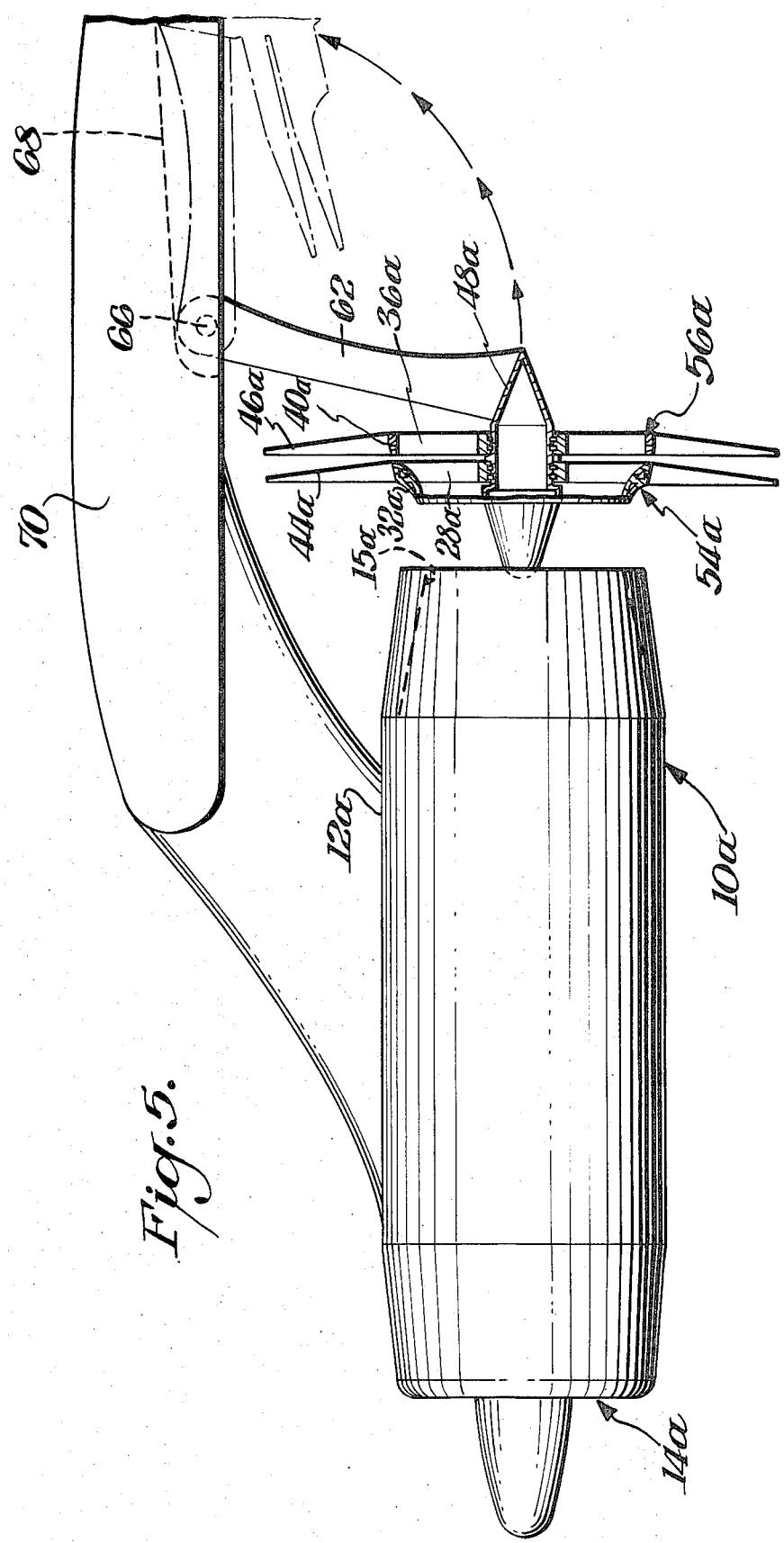
FIG. 5 is a side elevational view (part of which is in section) illustrating another embodiment of this invention.

FIG. 5 illustrates another embodiment of this invention, wherein the turbine-fan assemblies 54a and 56a are mounted on strut 62, aft of the turbo-jet engine 10a. Strut 62 is rotatably connected to wing 70 through pivot 66 in order to facilitate the retraction of the turbine-fan assemblies 54a and 56a away from the path of the exhaust. The turbine fan assembly is shown in phantom outline retracted into wing recess 68 for the operation of the turbo-jet gas generator by itself at supersonic airplane speeds, wherein the turbo-jet is more efficient than the combination turbo-jet and turbine-fan assembly.

Mounting the turbine-fan in this fashion requires no alteration to the tail pipe of the gas generator.

Figure 6:
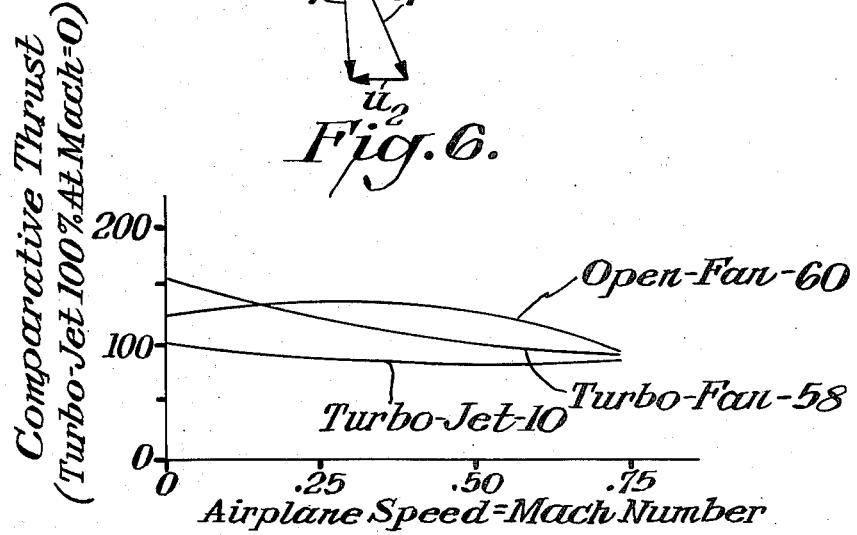
FIG. 6 is a set of curves illustrating comparative thrust for a typical turbo-jet, turbo-fan, and an embodiment of the invention.

Comparative thrusts of a turbo-jet 10, a turbo-fan 58 and the open-fan engines 60 are shown in FIG. 6, which plots engine thrust against airplane speed in Mach number. This comparison is only typical in order to describe the improved performance of this device having a fixed propeller blade angle described in the embodiment FIGS. 1 and 2. A controllable pitch propeller or a change in bypass ratio would show a different and improved comparison for this invention.

In this present invention a set of propeller blades are directly connected to extend radially outwardly from each of a pair of individual thrust augmenting counter rotating turbine wheels, which are arranged at the rear of the engine. The annular flow area decreases through the turbine wheels whereby the velocity of gas flow through them is increased to cause them to develop the required power for driving the propeller blades and to provide a strong propulsion thrust directly from the turbine exhaust to thereby improve overall propulsion efficiency up to supersonic speed, as shown in FIG. 6.

As previously described, applicant first increases the annular area from the compressor turbine exhaust duct to the first of the two turbine wheels and into the intermediate area between the first and the second thrust augmenting turbine wheels. This permits the first of the two wheels to develop a relatively high degree of tangential gas velocity while the decreasing annular area through the second of the turbine wheels maintains substantial gas flow velocity and directs it along the longitudinal centerline to develop efficient propulsion thrust. The decreasing annular area of the second of the two turbine wheels also permits the power developed by the two turbine wheels to be balanced with each other which is very important in preventing unbalanced torque. It also has relatively low gas velocities and steadily increasing annular flow areas through all of the turbine stages.

The usual by-pass fan is a compressor wherein the intake air is expanded in a jet nozzle to obtain velocity increase and thrust. Because of the difficulty of efficiently diffusing air through the blading, this component is inherently inefficient. Even with a short by-pass duct to minimize pressure losses, it is unlikely that more than 85 percent of the shaft energy is converted to available pressure head at the jet nozzle. It also must add a separate exhaust nozzle to the rear of the engine. A propeller on the other hand, is an impulse device which converts shaft energy directly to air velocity and thrust. Propellers are therefore inherently more efficient than compressor fans as a thrust producing component. At all blading velocities including supersonic, impulse blading typical of propellers is more efficient than the reaction blading typical of by-pass fans. Propeller thrust efficiencies of 90% are not uncommon, whereas it is very doubtful that any by-pass fan operates at much more than 70 percent thrust efficiency. Therefore, one basic advantage of the OPEN-FAN of the present invention is the use of propeller technology for the fan. To achieve high propeller disk area power loadings with good efficiency, contrarotating propellers are used to eliminate slip stream swirl. Engine net torque is also eliminated and stators are not required between the power turbine stages with this design.

I claim:

1. A thrust-augmenting device for a turbo-jet engine having gases flowing through it comprising a pair of individual thrust augmenting counter rotating impulse turbine wheels having an annular flow area disposed in the rear of said engine on the longitudinal centerline of said gases flowing through said engine whereby said gases rotate said impulse turbine wheels in opposite directions, a set of propeller blades directly connected to extend radially outwardly from each of said impulse turbine wheels whereby said impulse turbine wheels extract energy from said gases and augment the thrust of said engine, the rotating characteristics of said single pair of thrust augmenting turbine wheels and said propeller blades being constructed and arranged to substantially augment the thrust of said engine, and said annular flow area decreasing in said turbine wheels in the direction of flow through said engine whereby the velocity of gas flow through said turbine wheels is increased to cause said turbine wheels to develop the required power for driving said propeller blades and to provide a strong propulsion thrust directly from the exhaust from said turbine wheels to improve the overall propulsion efficiency of said engine up to supersonic speed.

2. A device as set forth in claim 1 wherein a bearing means is connected at the rear of said engine, said impulse turbine wheels being mounted upon said bearing means, said bearing means comprising a stationary housing external to said bearing means, seals in said housing for confining lubricating oil within it, and oil supply and drain means in said housing for supplying and draining oil therefrom.

3. A device as set forth in claim 1 wherein said impulse turbine wheels are of the axial flow type.

4. A device as set forth in claim 1 wherein said turbine wheels have a radial dimension and said radial dimension initially increases in a direction away from said engine whereby substantial power is developed in said turbine wheels for driving said propeller blades without diverting the exhaust gas flow from the exit from said turbine wheels away from said longitudinal centerline.

5. A device as set forth in claim 1 wherein said impulse turbine wheels and attached propellers are constructed and arranged to be easily removable and replaceable for varying the characteristics of said engine.

6. A device as set forth in claim 1 wherein said turbine wheels include annular rings to which said propeller blades are attached.

7. A device as set forth in claim 1 wherein an intermediate annular area is disposed between said turbine wheels, and the annular area of the second of two turbine wheels in the direction of flow of said gases decreases at the exit to substantially less than said intermediate annular area whereby a substantially high gas velocity is maintained through said second of said turbine wheels.

8. A device as set forth in claim 1 wherein said propeller blades are fully open.

9. A device as set forth in claim 1 wherein a single pair of said impulse turbine wheels are provided.

* * * * *